(12) United States Patent
Walton et al.

(10) Patent No.: US 11,670,958 B2
(45) Date of Patent: Jun. 6, 2023

(54) ELECTRICAL APPARATUS, POWER SUPPLY SYSTEM AND METHOD OF MANUFACTURING THE ELECTRICAL APPARATUS

(71) Applicant: ABB Schweiz AG, Baden (CH)

(72) Inventors: Simon Walton, Napier (NZ); Sridhar Pulikanti, Napier (NZ); Dustin Murdock, Napier (NZ); Nicholas James Elliott, Hastings (NZ); Robert Turner, Hastings (NZ); Parthasaradhy Kozhiparambil Kumaran, Napier (NZ)

(73) Assignee: ABB Schweiz AG, Baden (CH)

( * ) Notice: Subject to any disclaimer, the term of this patent is extended or adjusted under 35 U.S.C. 154(b) by 0 days.

(21) Appl. No.: 17/421,225

(22) PCT Filed: Nov. 22, 2019

(86) PCT No.: PCT/EP2019/082297
§ 371 (c)(1),
(2) Date: Jul. 7, 2021

(87) PCT Pub. No.: WO2021/098973
PCT Pub. Date: May 27, 2021

(65) Prior Publication Data
US 2022/0069615 A1 Mar. 3, 2022

(51) Int. Cl.
*H02J 9/06* (2006.01)
*H02J 3/00* (2006.01)
*H02J 3/32* (2006.01)

(52) U.S. Cl.
CPC ............ *H02J 9/062* (2013.01); *H02J 3/0012* (2020.01); *H02J 3/32* (2013.01)

(58) Field of Classification Search
CPC .... H02J 9/062; H02J 3/001; H02J 3/32; H02J 9/002; H02J 9/08; H02J 3/388; G06F 1/263; G06F 1/28; G06F 1/305
(Continued)

(56) References Cited

U.S. PATENT DOCUMENTS

| 9,793,753 B2 * | 10/2017 | Budde .................... G01R 21/00 |
| 2004/0084965 A1 * | 5/2004 | Welches ................... H02J 3/30 |
| | | 307/64 |
| 2020/0321800 A1 * | 10/2020 | Bush ........................ H02J 9/08 |

FOREIGN PATENT DOCUMENTS

| JP | 2008-141815 A | 6/2008 |
| JP | 2011-120368 A | 6/2011 |

(Continued)

OTHER PUBLICATIONS

European Patent Office, International Search Report in International Patent Application No. PCT/EP2019/082297, 4 pp. (dated Mar. 17, 2020).

(Continued)

*Primary Examiner* — Richard Tan
(74) *Attorney, Agent, or Firm* — Leydig, Voit & Mayer, Ltd.

(57) ABSTRACT

Embodiments of the present disclosure provide an electrical apparatus, a power supply system having the same and a method of manufacturing the electrical apparatus. The electrical apparatus includes a detecting circuit coupled to a generator and configured to detect a frequency of the generator. The electrical apparatus also includes a controller coupled to the detecting circuit and configured to receive a first signal indicating the detected frequency and adjust the frequency of the generator in response to determining that the detected frequency is out of a predetermined frequency range. In this way, an actively controlling of the changing (Continued)

rate of the power to and from generator may be achieved, if the generator frequency exceeds the configured limits.

10 Claims, 5 Drawing Sheets

(58) Field of Classification Search
USPC .......................................................... 307/66
See application file for complete search history.

(56) References Cited

FOREIGN PATENT DOCUMENTS

| JP | 2012-41931 A | 3/2012 |
|---|---|---|
| WO | WO 2014/073030 A1 | 5/2014 |
| WO | WO 2015/026343 A1 | 2/2015 |

OTHER PUBLICATIONS

European Patent Office, Written Opinion in International Patent Application No. PCT/EP2019/082297, 6 pp. (dated Mar. 17, 2020).
Japan Patent Office, Notice of Reasons for Refusal in Japanese Patent Application No. 2021-538464, 15 pp. (dated Sep. 6, 2022).
Japan Patent Office, Decision to Grant a Patent in Japanese Patent Application No. 2021-538464, 5 pp. (dated Nov. 1, 2022).
Korean Intellectual Property Office, Request for the Submission of an Opinion in Korean Patent Application No. 10-2021-7021259, 9 pp. (dated Feb. 10, 2023).

* cited by examiner

ELECTRICAL APPARATUS, POWER SUPPLY SYSTEM AND METHOD OF MANUFACTURING THE ELECTRICAL APPARATUS

CROSS-REFERENCE TO RELATED APPLICATIONS

This patent application is a U.S. national phase patent application of International Patent Application No. PCT/EP2019/082297, filed Nov. 22, 2019, which is fully incorporated herein by reference for all purposes.

FIELD

Embodiments of the present disclosure generally relate to an electrical apparatus, a power supply system having the same and a method of manufacturing the electrical apparatus.

BACKGROUND

For high-uptime sites, a generator may often use as a back-up power supply when the there is a grid fault. Once the grid fails, the generator can be enabled to generate power to be supplied to the load. If the load is sufficiently large, the frequency of the generator may vary significantly.

Many typical loads, including commercial, industrial and data-center loads, claim a high sensitivity to frequency variation of no more than ±5%, however, typical generators claim frequency variations of 25% for 100% load steps. Thus, if the generator takes over the entire load instantly from the gird, the frequency variation of the generator may exceed what the load can tolerate.

Some assistant power supply is also used for the power supply system, for example, an uninterruptible power supply (UPS), also known as a battery backup, provides backup power when your regular power source fails or voltage drops to an unacceptable level. As an assistant power source, the UPS provides power from an energy source (e.g. batteries) to the load until a generator can start running and take-over supplying power to the load.

Similarly, one possible problem is that once a generator has started and can take over the load from the UPS, if the generator takes over the entire load instantly, the generator frequency may also have a large frequency variation.

SUMMARY

Embodiments of the present disclosure provide an electrical apparatus, a power supply system having the same and a method of manufacturing the electrical apparatus.

In a first aspect, an electrical apparatus is provided. The electrical apparatus comprises a detecting circuit coupled to a generator and configured to detect a frequency of the generator. The electrical apparatus also comprises a controller coupled to the detecting circuit and configured to receive a first signal indicating the detected frequency and adjust the frequency of the generator in response to determining that the detected frequency is out of a predetermined frequency range.

By using the solution of the first aspect, the frequency variation of the generator may be monitored and adjusted by the electrical apparatus if the frequency of the generator goes beyond a tolerable range. In this way, an actively controlling of the changing rate of the power to and from generator may be achieved, if the generator frequency exceeds the configured limits. The power supply associated with the generator will not be intervened until the frequency limits are exceeded, at which point the changing rate of the power is changed to prevent the frequency limits from being exceeded.

In some embodiments, the detecting circuit is further coupled to a load and configured to detect a power consumed by the load, and wherein the controller is further configured to receive a second signal indicating the power consumed by the load and adjust the frequency of the generator by a frequency amount based on the second signal.

In some embodiments, the controller is further configured to adjust the frequency of the generator by adjusting a power level from the generator to the load based on the first signal and the second signal.

By measuring the power consumed by the load and the frequency of the generator, a frequency amount or a certain power level to be adjusted at the generator may be determined by the controller, which may lead to a more precise and effective adjustment.

In some embodiments, the electrical apparatus further comprises a rectifier coupled to the generator and the controller; an energy storage device coupled to the rectifier and the controller; and an inverter coupled to the energy storage device and the controller. The controller is configured to cause the rectifier, the energy storage device and the inverter to adjust the power level from the generator to the load.

Therefore, for achieving the automatic adjustment of the frequency at the generator, the rectifier, the inverter and the energy storage device of the UPS 140 may also be adopted to perform the energy transfer and conversion, which are necessary components for this solution In some embodiments, the controller is further configured to in response to determining that the detected frequency exceeds an upper threshold frequency of the predetermined frequency range, determine the frequency amount to be adjusted based on the detected frequency and the upper threshold frequency; determine a power mount to be loaded by the electrical apparatus based on the frequency amount and the power consumed by the load; and deliver the power mount from the energy storage device to the generator by discharging the energy storage device.

In some embodiments, the controller is further configured to in response to determining that the detected frequency is lower than a lower threshold frequency of the predetermined frequency range, determine the frequency amount to be adjusted based on the detected frequency and the lower threshold frequency; determine a power mount to be unloaded by the electrical apparatus based on the frequency amount and the power consumed by the load; absorb the power mount from the generator to the energy storage device by charging the energy storage device.

As mentioned above, the value of the frequency of the generator should be maintained within a predetermined range to avoid an intolerable frequency variation. In this way, the generator frequency may be brought back to the limit by means of increasing or decreasing the load carried by the electrical apparatus, thereby the safety of the generator and the load connected to the generator may be guaranteed.

In some embodiments, the inverter is configured to convert direct voltage from the energy storage device to the alternating voltage during the discharging of the energy storage device.

In some embodiments, the rectifier is configured to convert alternating voltage from the generator to direct voltage during the charging of the energy storage device.

In some embodiments, the generator is coupled between the electrical apparatus and the load.

In some embodiments, the electrical apparatus is coupled between the generator and the load.

In some embodiment, a further load is coupled between the generator and the electrical apparatus and configured to be supplied by at least one of the generator and the electrical apparatus.

The electrical apparatus may realize the frequency adjustment for the generator in various power supply environment. Whether the generator is directly connected to the load or the electrical device is coupled between the generator and the load, the electrical device ensures that the frequency of the generator is adjusted to within a predetermined range.

In some embodiment, the electrical apparatus further comprises a bypass element coupled to the controller and the controller is further configured to in response to determining that the power consumed by the load is carried by the generator, bypass the electrical apparatus.

In some embodiment, the electrical apparatus is an UPS.

In a second aspect, a power supply system is provided. The power supply system comprises a load and a generator coupled to the load and configured to supply power to the load. The power supply system also comprises an electrical apparatus according to the first aspect coupled to the load and the generator.

In a third aspect, a manufacturing method of an electrical apparatus is provided. The method comprises providing a detecting circuit coupled to a generator and configured to detect a frequency of the generator. The method further comprises providing a controller coupled to the detecting circuit and configured to receive a first signal indicating the detected frequency and adjust the frequency of the generator in response to determining that the detected frequency is out of a predetermined frequency range.

It is to be understood that the Summary is not intended to identify key or essential features of embodiments of the present disclosure, nor is it intended to be used to limit the scope of the present disclosure. Other features of the present disclosure will become easily comprehensible through the description below.

BRIEF DESCRIPTION OF THE DRAWINGS

The above and other objectives, features and advantages of the present disclosure will become more apparent through more detailed depiction of example embodiments of the present disclosure in conjunction with the accompanying drawings, wherein in the example embodiments of the present disclosure, same reference numerals usually represent same components.

Throughout the drawings, the same or similar reference symbols are used to indicate the same or similar elements.

DETAILED DESCRIPTION

The present disclosure will now be discussed with reference to several example embodiments. It is to be understood these embodiments are discussed only for the purpose of enabling those skilled persons in the art to better understand and thus implement the present disclosure, rather than suggesting any limitations on the scope of the subject matter.

As used herein, the term "comprises" and its variants are to be read as open terms that mean "comprises, but is not limited to." The term "based on" is to be read as "based at least in part on." The term "one embodiment" and "an embodiment" are to be read as "at least one embodiment." The term "another embodiment" is to be read as "at least one other embodiment." The terms "first," "second," and the like may refer to different or same objects. Other definitions, explicit and implicit, may be comprised below. A definition of a term is consistent throughout the description unless the context clearly indicates otherwise.

Unless specified or limited otherwise, the terms "mounted," "connected," "supported," and "coupled" and variations thereof are used broadly and encompass direct and indirect mountings, connections, supports, and couplings. Furthermore, "connected" and "coupled" are not restricted to physical or mechanical connections or couplings. In the description below, like reference numerals and labels are used to describe the same, similar or corresponding parts in the figures. Other definitions, explicit and implicit, may be included below.

As mentioned above, a generator may often use as a back-up power for high-uptime sites supply when the grid fails. Once the grid fails, the generator can be enabled to generate power to be supplied to the load. If the load is sufficiently large, the frequency of the generator may vary significantly.

Many typical loads, including commercial, industrial and data-center loads, claim a high sensitivity to frequency variation of no more than ±5%, however, typical generators claim frequency variations of 25% for 100% load steps. Thus, if the generator takes over the entire load instantly from the gird, the frequency variation of the generator may exceed what the load can tolerate.

Some assistant power supply is also used for the power supply system, for example, an uninterruptible power supply (UPS), also known as a battery backup, provides backup power when your regular power source fails or voltage drops to an unacceptable level. As an assistant power source, the UPS provides power from an energy source (e.g. batteries) to the load until a generator can start running and take-over supplying power to the load.

Similarly, one possible problem is that once a generator has started and can take over the load from the UPS, if the generator takes over the entire load instantly, the generator frequency may also have a large frequency variation.

Some approaches have been proposed for managing the generator frequency problem. For example, one approach is known as frequency independence. The most common type of UPSs are the dual-conversion UPSs, which, due to their dual-conversion implementation, allows the output (load) frequency to be independent of the input (generator) frequency, which may be referred to as "frequency independent". Being frequency independent allows the output frequency to remain constant, while the input frequency can vary significantly.

However, not all UPSs are frequency independent and as such their output frequency is tied to the input frequency. Some configurations of generator and UPS may have some loads directly connected to the generator whereby if the generator frequency cannot be allowed to go outside of the loads' frequency limits.

The other common approach is known as generator walk-in. This method consists of the UPS slowly handing the load to the generator, rather than dumping it on all at once, thereby giving the generator the time to pick-up the load to minimize the frequency variation.

The walk-in functionality is typically implemented as a power ramp. If the ramp is too fast, then the generator frequency may exceed the limits. If the ramp is too slow then the UPS is unnecessarily taking longer to transfer the power to the generator and risks running out of battery storage. The ramp rate must be configured for different generator behaviors.

Therefore, the present disclosure proposes a method for controlling the frequency of the generator by using the UPS. By means of the detection for the generator, the frequency at the generator can be adjusted to maintain within a tolerable range. In this way, the safety and performance of the power supply system may be improved.

Figure 1:
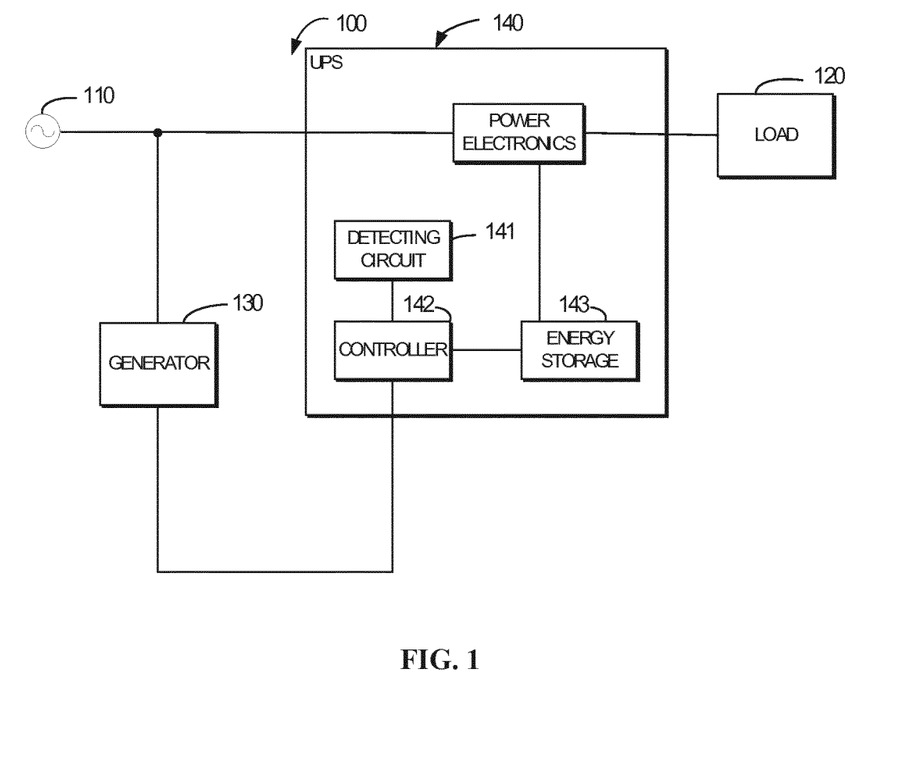
FIG. 1 illustrates a simplified block diagram of a power supply system having an electrical apparatus in accordance with embodiments of the present disclosure.

FIG. 1 illustrates a simplified block diagram of a power supply system 100 having an electrical apparatus 140 in accordance with embodiments of the present disclosure.

As shown in FIG. 1, a power supply system 100 may comprise a load 120 coupled to a grid 110. Generally, the load 120 can be supplied by the grid 110. The power supply system 100 may also comprise a generator 130. The generator 130 is coupled to the load 120 and may be considered as a back-up power supply for the load 120. As mentioned above, in a case of a failure of the grid, the generator 130 may start to run and generate power to take over the load.

The power supply system 100 may also comprise an electrical apparatus 140, hereinafter may be referred to as UPS 140. The UPS 140 comprises a detecting circuit 141, which may be coupled to the generator 130 to detect the frequency of the generator 130. The UPS 140 further comprises a controller 142 coupled to the detecting circuit 141. The detecting circuit 141 may generate a signal indicating the detected frequency of the generator 130 and transfer the signal to the controller 142. The controller 142 adjusts the frequency of the generator, if the controller 142 determines that the detected frequency is out of a predetermined frequency range.

For example, if the controller 142 receives the signal indicating the detected frequency, the controller 142 may compare the detected frequency with a threshold frequency, which may be preconfigured or predetermined based on the properties of the generator. The threshold frequency may comprise an upper limit and a lower limit. If the detected frequency exceeds the upper limit or is lower than the lower limit, the controller 142 may be started to adjust the frequency of the generator.

A significant frequency variation may occur in a transition period, during which, for example, the load may be taken over by the generator from the power supply. Moreover, if the load changes rapidly, the frequency variation may also occur. By using the UPS to detect the frequency at the generator 130, the frequency variation of the generator 130 may be adjusted by the UPS 140 if the frequency of the generator 130 goes beyond a tolerable range. In this way, an actively controlling of the changing rate of the power to and from generator 130 may be achieved, if the generator frequency exceeds the configured limits. The power supply associated with the generator will not be intervened until the frequency limits are exceeded, at which point the changing rate of the power is changed to prevent the frequency limits from being exceeded.

In some embodiments, the detecting circuit 141 of the UPS 140 may be further coupled to the load 120 and configured to detect a power consumed by the load 120. The detecting circuit 141 may generate a further signal indicating the power consumed by the load 120 and transfer the further signal to the controller 142.

If the controller 142 receives a second signal, the controller 142 may adjust the frequency of the generator 130 by a frequency amount based on the second signal. That is, the controller 142 may determine the frequency amount to be adjusted based on the power consumed by the load 120.

In some embodiments, the controller 142 may further adjust the frequency of the generator 130 by adjusting a power level from the generator 130 to the load 120 based on the first signal and the second signal.

By measuring the power consumed by the load and the frequency of the generator, a frequency amount or a certain power level to be adjusted at the generator may be determined by the controller, which may lead to a more precise and effective adjustment.

In some embodiments, the UPS 140 may also comprise an energy storage device 143, which may be coupled to the controller 142. The controller 142 may further cause the energy storage device 143 to adjust the power level from the generator 130 to the load 120.

In some embodiments, if the controller 142 determines that the detected frequency exceeds an upper threshold frequency of the predetermined frequency range, the controller 142 may determine the frequency amount to be adjusted based on the detected frequency and the upper threshold frequency. The controller 142 may further determine a power mount to be loaded by the UPS 140 based on the frequency amount and the power consumed by the load. Then the determined power mount may be delivered from the UPS 140 to the generator 130. During this process, the energy storage device 143 may be discharged to provide the determined power mount.

In some embodiments, if the controller 142 determines that the detected frequency is lower than a lower threshold frequency of the predetermined frequency range, the controller 142 may determine the frequency amount to be adjusted based on the detected frequency and the lower threshold frequency. The controller 142 may further determine a power mount to be unloaded by the electrical apparatus based on the frequency amount and the power consumed by the load. Then the determined power mount may be absorbed from the generator 130 to the UPS 140. During this process, the energy storage device 143 may be charged by the absorbed power.

In some embodiments, the UPS 140 may also comprise a power electronic device 146 coupled to the energy storage device 143. The power electronic device 146 may be configured to transfer the power to the load 140. For example, the power electronic device 146 may include any suitable power conversion elements.

As mentioned above, the value of the frequency of the generator should be maintained within a predetermined range to avoid an intolerable frequency variation. In this way, the generator frequency may be brought back to the limit by means of increasing or decreasing the load carried by the electrical apparatus, thereby the safety of the generator and the load connected to the generator may be guaranteed.

Figure 2A:
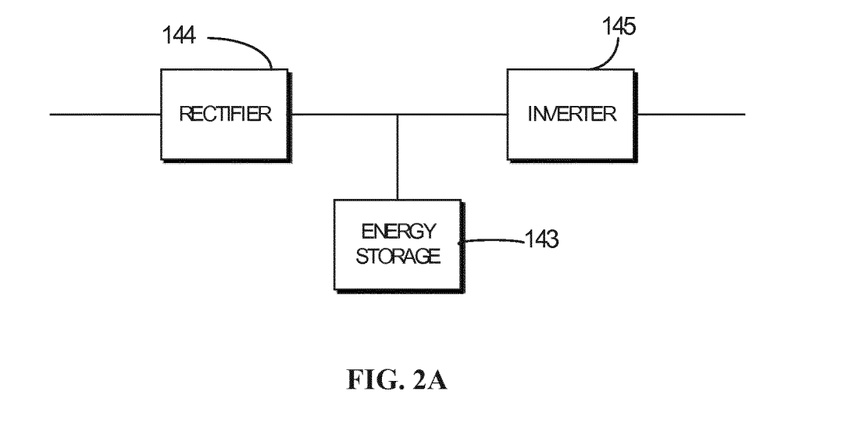
FIGS. 2A and 2B show embodiments of the rectifier and inverter of the electrical apparatus according to embodiments of the present disclosure.
Figure 2B:
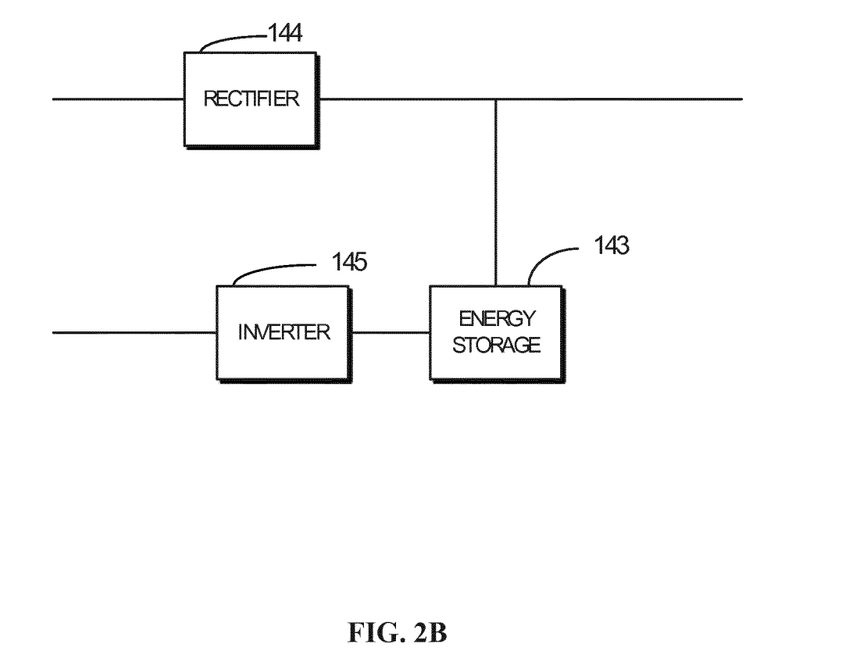

The UPS 140 may also comprise other components such as a rectifier or an inverter. FIGS. 2A and 2B show embodiments of the rectifier and inverter of the electrical apparatus according to embodiments of the present disclosure.

As shown, the rectifier 144 and the inverter 145 may be coupled to energy storage device 143 respectively. For example, the rectifier 144 may be configured to convert alternating voltage from the generator 130 to direct voltage during the charging of the energy storage device 143. The inverter 145 may be configured to convert direct voltage from the energy storage device 143 to the alternating voltage during the discharging of the energy storage device 143.

In some embodiments, the rectifier 144 and the inverter 145 may also be coupled to the generator 130 to deliver the power. The rectifier 144 and the inverter 145 may be coupled to the controller 142 to perform the conversion based on the command received from the controller.

Therefore, for achieving the automatic adjustment of the frequency at the generator, the rectifier, the inverter and the energy storage device of the UPS 140 may also be adopted to perform the energy transfer and conversion, which are necessary components for this solution.

Figure 3A:
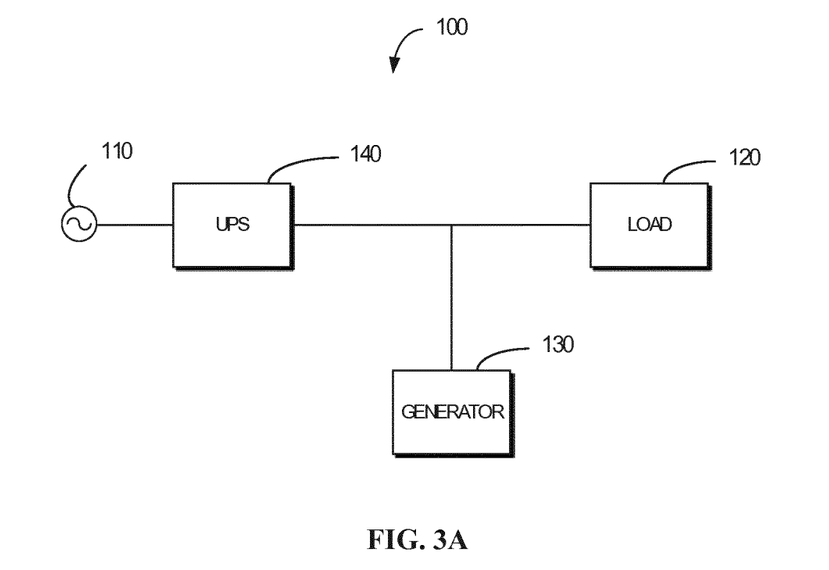
FIGS. 3A-3C show different application scenarios for the electrical apparatus in accordance with embodiments of the present disclosure.
Figure 3B:
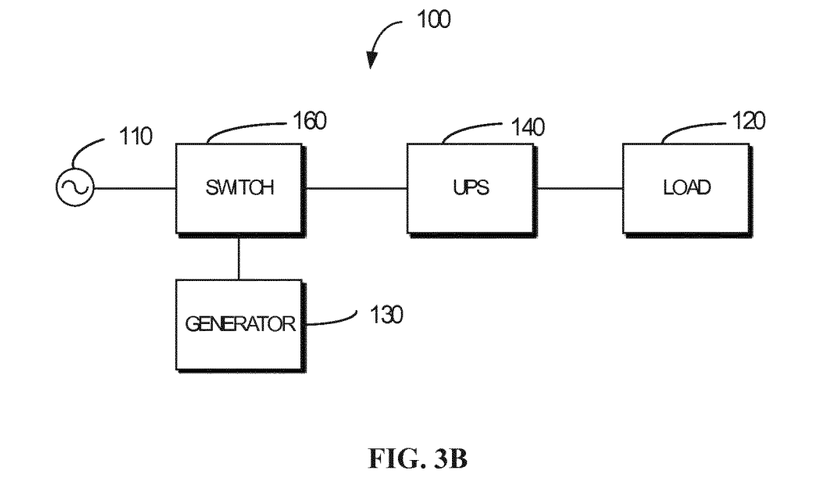
Figure 3C:
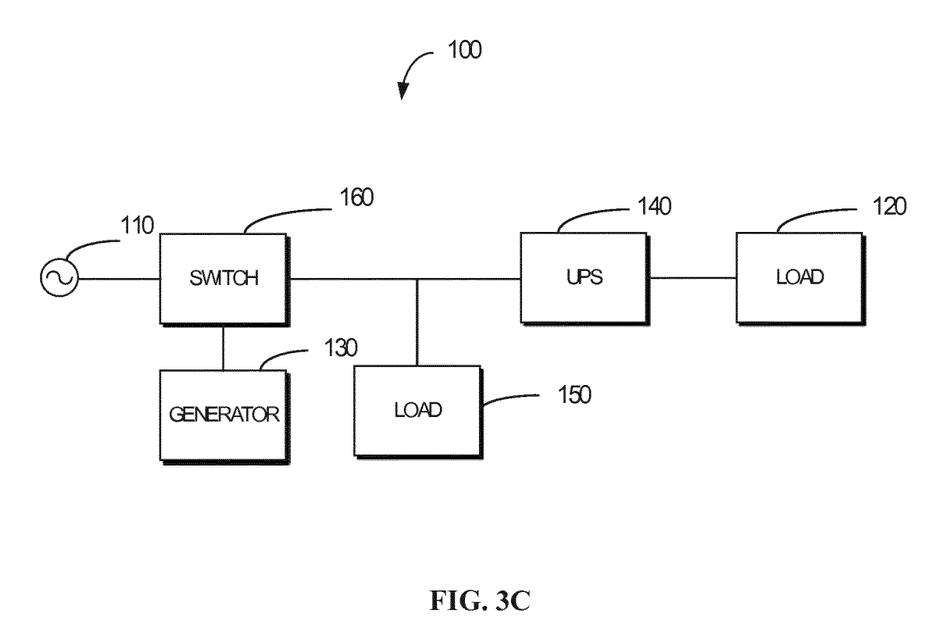

The UPS 140 and the adjustment method of the frequency at the generator may be used in various application scenarios. FIGS. 3A-3C show different application scenarios for the electrical apparatus in accordance with embodiments of the present disclosure.

For example, in FIG. 3A, the generator 130 is coupled to an output of the UPS and directly coupled to the load 120, while the generator 130 is coupled to an input of the UPS 140 and the UPS is directly coupled to the load 120 in FIG. 3B. In FIG. 3C, a further load 150 is also coupled to the generator 130. In a case that the load is directly coupled to the generator, as shown in FIGS. 3B and 3C, the generator frequency cannot be allowed to go outside of the loads' frequency limits. According to the actively control of the UPS according to the present disclosure, the frequency of the generator can be prevented from reaching an intolerable frequency value regardless of the type of the UPS. For example, the UPS cannot be implemented as a dual-conversion UPS.

Therefore, the UPS according to the present disclosure may realize the frequency adjustment for the generator in various power supply environment. Whether the generator is directly connected to the load or the electrical device is coupled between the generator and the load, the electrical device ensures that the frequency of the generator is adjusted to within a predetermined range.

Figure 4:
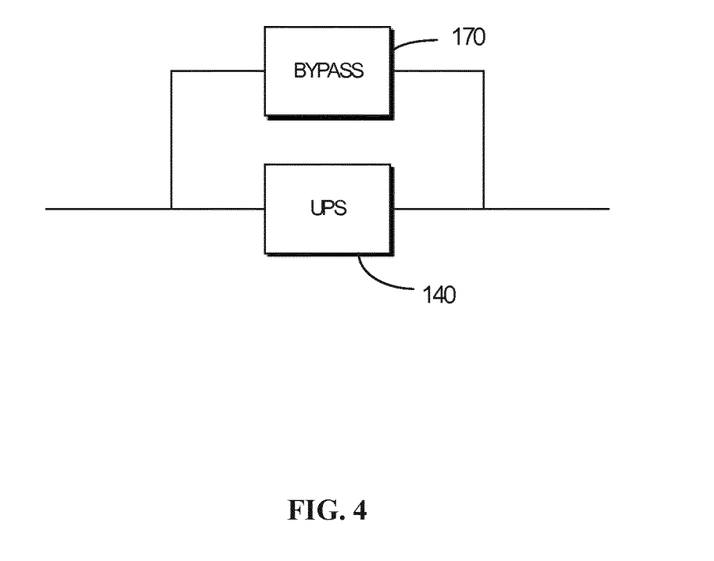
FIG. 4 shows an embodiment of bypass elements of the electrical apparatus according to embodiments of the present disclosure.

FIG. 4 shows an embodiment of bypass elements of the electrical apparatus according to embodiments of the present disclosure. As shown, the UPS 140 may further comprise a bypass element 170. The bypass element 170 may be coupled to the controller (not shown). The controller may bypass the UPS 140 if the power consumed by the load has been taken over by the generator completely.

In this solution, the UPS is used to actively control the rate of the change of power to and from generator if the generator frequency exceeds the configured limits. It is advantageous to intervene only when the frequency limits are exceeded, at which point the rate of the change of power is changed to prevent the frequency limits from being exceeded. By this means, the UPS transfers the power to or from the generator as fast as the generator can handle without it exceeding the frequency limits.

Moreover, by automatically varying the rate of the change of power the system does not need to be calibrated for different generator behaviors. As the generator frequency never exceeds the configurable limits, the UPS can be a frequency-dependent UPS, and also loads directly connected to the generator are safe.

A supply power system having the UPS 140 is also provided in the present disclosure. The supply power system may be any of the supply power system 100 shown in FIG. 1 and FIG. 3A-3C, but not limit to.

Furthermore, it should be understood that the controller 142 may be integrated in the UPS 140, such as a chip embedded in the UPS 140. The controller 142 may be implemented as any individual device, element and components separate from the UPS 140.

Figure 5:
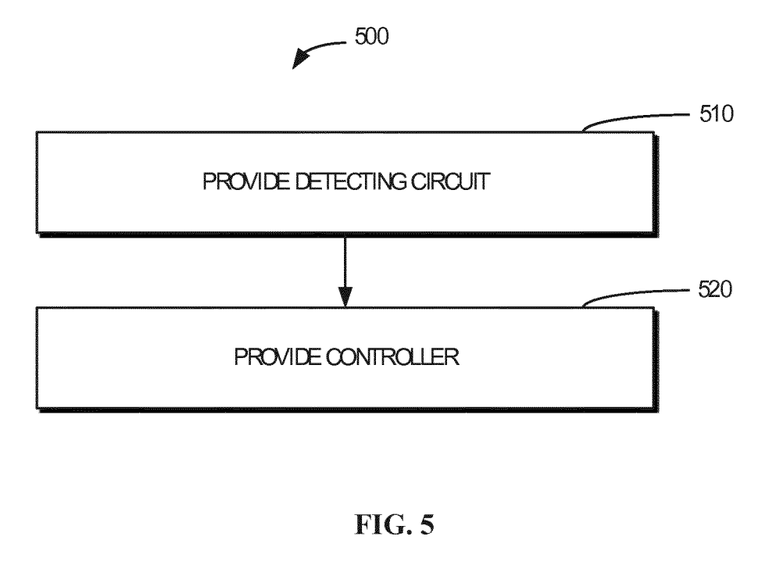
FIG. 5 shows a flowchart illustrating a manufacturing method of an electrical apparatus according to embodiments of the present disclosure.

Further, the present disclosure also provides a manufacturing method of the UPS. FIG. 5 shows a flowchart illustrating a manufacturing method of an electrical apparatus according to embodiments of the present disclosure.

At 610, a detecting circuit coupled to a generator and configured to detect a frequency of the generator is provide. At 620, a controller coupled to the detecting circuit and configured to receive a first signal indicating the detected frequency and adjust the frequency of the generator in response to determining that the detected frequency is out of a predetermined frequency range is provided.

In the solution of the present disclosure, the UPS may measure both the generator voltage frequency and the load power. The UPS is configured to support any load steps (increases or decreases), such that load increases and decreases will discharge or charge the energy storage device, respectively. In a ramp or filtered fashion, the UPS passes load to the generator whereby aiming for zero charge or discharge of its energy storage. If, however, the generator voltage frequency hits the configured frequency upper or lower limits then the UPS holds the current power setpoint. If the generator voltage frequency exceeds the configured frequency limits then the UPS increases or decreases its load such as to bring the generator frequency back to the limit.

It should be appreciated that the above detailed embodiments of the present disclosure are only to exemplify or explain principles of the present disclosure and not to limit the present disclosure. Therefore, any modifications, equivalent alternatives and improvement, etc. without departing from the spirit and scope of the present disclosure shall be comprised in the scope of protection of the present disclosure. Meanwhile, appended claims of the present disclosure aim to cover all the variations and modifications falling under the scope and boundary of the claims or equivalents of the scope and boundary.

What is claimed is:

1. An electrical apparatus comprising:
   a detecting circuit coupled to a generator and configured to detect a frequency of the generator, wherein the detecting circuit is further coupled to a load and configured to detect a power consumed by the load;
   a rectifier coupled to the generator,
   an energy storage device coupled to the rectifier;
   an inverter coupled to the energy storage device; and
   a controller coupled to the detecting circuit, the rectifier, the inverter, and the energy storage device, the controller configured to:
      receive a first signal indicating the detected frequency and adjust the frequency of the generator in response to determining that the detected frequency is out of a predetermined frequency range, such that either:

in response to determining that the detected frequency exceeds an upper threshold frequency of the predetermined frequency range:
  determine a frequency amount to be adjusted based on the detected frequency and the upper threshold frequency;
  determine a power amount to be loaded by the electrical apparatus based on the frequency amount and the power consumed by the load; and
  deliver the power amount from the energy storage device to the generator by discharging the energy storage device; or
in response to determining that the detected frequency is lower than a lower threshold frequency of the predetermined frequency range:
  determine a frequency amount to be adjusted based on the detected frequency and the lower threshold frequency;
  determine a power amount to be unloaded by the electrical apparatus based on the frequency amount and the power consumed by the load; and
  absorb the power amount from the generator to the energy storage device by charging the energy storage device; and
receive a second signal indicating the power consumed by the load and adjust the frequency of the generator by a frequency amount based on the second signal, wherein the frequency of the generator is adjusted by adjusting a power level from the generator to the load based on the first signal and the second signal; and
cause the rectifier, the energy storage device, and the inverter to adjust the power level from the generator to the load.

2. The electrical apparatus of claim 1, wherein the inverter is configured to convert direct voltage from the energy storage device to alternating voltage during the discharging of the energy storage device.

3. The electrical apparatus of claim 1, wherein the rectifier is configured to convert alternating voltage from the generator to direct voltage during the charging of the energy storage device.

4. The electrical apparatus of claim 1, wherein the generator is coupled between the electrical apparatus and the load.

5. The electrical apparatus of claim 1, wherein the electrical apparatus is coupled between the generator and the load.

6. The electrical apparatus of claim 5, wherein a further load is coupled between the generator and the electrical apparatus and configured to be supplied by at least one of the generator and the electrical apparatus.

7. The electrical apparatus of claim 1, wherein the electrical apparatus further comprises a bypass element coupled to the controller and the controller is further configured to in response to determining that the power consumed by the load is carried by the generator, bypass the electrical apparatus.

8. The electrical apparatus of claim 1, wherein the electrical apparatus is an Uninterrupted Power Supply.

9. A power supply system comprising:
a load;
a generator coupled to the load and configured to supply power to the load; and
an electrical apparatus coupled to the generator and the load,
wherein the electrical apparatus comprises:
  a detecting circuit configured to detect a frequency of the generator, the detecting circuit being further coupled to the load and configured to detect a power consumed by the load;
  a rectifier coupled to the generator;
  an energy storage device coupled to the rectifier;
  an inverter coupled to the energy storage device; and
  a controller coupled to the detecting circuit, the rectifier, the inverter, and the energy storage device, the controller configured to:
    receive a first signal indicating the detected frequency and adjust the frequency of the generator in response to determining that the detected frequency is out of a predetermined frequency range, such that either:
      in response to determining that the detected frequency exceeds an upper threshold frequency of the predetermined frequency range:
        determine a frequency amount to be adjusted based on the detected frequency and the upper threshold frequency;
        determine a power amount to be loaded by the electrical apparatus based on the frequency amount and the power consumed by the load; and
        deliver the power amount from the energy storage device to the generator by discharging the energy storage device, or
      in response to determining that the detected frequency is lower than a lower threshold frequency of the predetermined frequency range:
        determine a frequency amount to be adjusted based on the detected frequency and the lower threshold frequency;
        determine a power amount to be unloaded by the electrical apparatus based on the frequency amount and the power consumed by the load; and
        absorb the power amount from the generator to the energy storage device by charging the energy storage device; and
    receive a second signal indicating the power consumed by the load and adjust the frequency of the generator by a frequency amount based on the second signal, wherein the frequency of the generator is adjusted by adjusting a power level from the generator to the load based on the first signal and the second signal; and
    cause the rectifier, the energy storage device, and the inverter to adjust the power level from the generator to the load.

10. A method of manufacturing an electrical apparatus comprising:
providing a detecting circuit coupled to a generator and configured to detect a frequency of the generator, wherein the detecting circuit is further coupled to a load and configured to detect a power consumed by the load;
providing a rectifier coupled to the generator;
providing an energy storage device coupled to the rectifier;
providing an inverter coupled to the energy storage device; and providing a controller coupled to the detecting circuit, the rectifier, the inverter, and the energy storage device, the controller configured to:
receive a first signal indicating the detected frequency and adjust the frequency of the generator in response to determining that the detected frequency is out of a predetermined frequency range, such that either:
in response to determining that the detected frequency exceeds an upper threshold frequency of the predetermined frequency range:
determine a frequency amount to be adjusted based on the detected frequency and the upper threshold frequency;
determine a power amount to be loaded by the electrical apparatus based on the frequency amount and the power consumed by the load; and
deliver the power amount from the energy storage device to the generator by discharging the energy storage device; or
in response to determining that the detected frequency is lower than a lower threshold frequency of the predetermined frequency range:
determine a frequency amount to be adjusted based on the detected frequency and the lower threshold frequency;
determine a power amount to be unloaded by the electrical apparatus based on the frequency amount and the power consumed by the load; and
absorb the power amount from the generator to the energy storage device by charging the energy storage device; and
receive a second signal indicating the power consumed by the load and adjust the frequency of the generator by a frequency amount based on the second signal, wherein the frequency of the generator is adjusted by adjusting a power level from the generator to the load based on the first signal and the second signal; and
cause the rectifier, the energy storage device, and the inverter to adjust the power level from the generator to the load.

\* \* \* \* \*